Patented Mar. 9, 1948

2,437,368

UNITED STATES PATENT OFFICE 2,437,368

2-CHLOROETHYLCYCLOPROPYL ETHER AND METHOD OF PREPARING IT

Robert M. Vance, Cleveland, and Amos G. Horney, Worthington, Ohio, assignors to Air Reduction Company, Incorporated, New York, N. Y., a corporation of New York No Drawing. Application June 14, 1944, Serial No. 540,319

2 Claims. (Cl. 260—611)

This invention relates to a new chemical compound, 2-chloroethylcyclopropyl ether, and to a method of preparing it.

It is the object of the invention to provide a compound which is useful for various purposes but primarily as an intermediate in the preparation of other compounds, for example, the preparation of cyclopropyl vinyl ether, and to afford a method of preparation which is capable of application in relatively large scale commercial operations to produce high yields of the substantially pure compound.

Other objects and advantages of the invention will be apparent as it is better understood by reference to the following specification, in which the preferred embodiments of the invention are described.

The new compound 2-chloroethylcyclopropyl ether has the structural formula

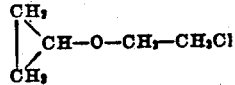

It is a colorless liquid with a characteristic ethereal odor and has a boiling point of 134–134.1° C. at 748 mm. Other characteristics are $$D_{14}^{20} = 1.013 \text{ and } n_{D}^{20} = 1.4350$$

Preparation of the new compound is best effected by cyclization of 1-chloro-3-bromo-2-(2-chloroethoxy) propane with zinc in water by the reaction

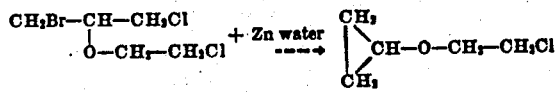

1-chloro-3-bromo-2-(2-chloroethoxy) propane is a new compound having a boiling point of 81–81.5° C. at 1 mm. The compound and the method of preparing it by reaction of allyl bromide with ethylene chlorohydrin and chlorine are described in our copending application Ser. No. 540,318, filed June 14, 1944.

To effect cyclization of 1-chloro-3-bromo-2-(2-chloroethoxy) propane about 700 grams of water are placed in a two liter three neck flask, fitted with an addition funnel, stirrer and Claisen head attached to a downward condenser. About 195 grams (3 mols) of zinc dust are added with vigorous stirring, and the flask is heated until water refluxes in the condenser between the flask and Claisen head. 535 grams (2.3 mols) of the ether are added drop by drop and the temperature is controlled in the reflux condenser so that the product distills over at a moderate rate. The product is separated from the water layer, dried with sodium sulphate and distilled without fractionation at atmospheric pressure. A yield of 146 grams (1.2 mols) of 2-chloroethylcyclopropyl ether is obtained.

The method as described affords a satisfactory and practicable procedure for the preparation of the desired product which may be carried out with suitable modification of the apparatus used to prepare the product for commercial use.

Various changes may be made in the details of the procedure without departing from the invention or sacrificing the advantages thereof.

We claim:

1. A new chemical compound, 2-chloroethylcyclopropyl ether with the structural formula:

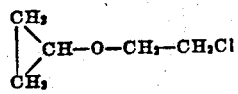

2. The method of preparing 2-chloroethylcyclopropyl ether which comprises cyclization of 1-chloro-3-bromo-2-(2-chloroethoxy) propane with zinc dust and water.

ROBERT M. VANCE.
AMOS G. HORNEY.

REFERENCES CITED

The following references are of record in the file of this patent:

UNITED STATES PATENTS

| Number | Name | Date |
|---|---|---|
| 1,941,108 | Reppe | Dec. 26, 1933 |
| 2,024,749 | Scott | Dec. 7, 1935 |
| 2,058,466 | Kharasch | Oct. 27, 1936 |
| 2,148,437 | Coleman | Feb. 28, 1939 |
| 2,299,411 | Rust | Oct. 20, 1942 |
| 2,303,549 | Horney | Dec. 1, 1942 |
| 2,330,979 | Krantz | Oct. 5, 1943 |